US006012832A

United States Patent [19]

Saunders et al.

[11] Patent Number: 6,012,832

[45] Date of Patent: Jan. 11, 2000

[54] CASHLESS PERIPHERAL DEVICE FOR A GAMING SYSTEM

[76] Inventors: Michael Saunders, 200 Ultra Dr., Henderson, Nev. 89014; Dennis Willard Sorenson, 8510 Hillside Dr., Alta Loma, Calif. 91701

[21] Appl. No.: 08/881,788

[22] Filed: Jun. 24, 1997

[51] Int. Cl.$^{7}$ .................................................. G06F 15/28

[52] U.S. Cl. .......................... 364/410; 235/380; 273/435

[58] Field of Search .......................... 235/380; 364/410; 273/435

[56] References Cited

U.S. PATENT DOCUMENTS

| | | | |
|---|---|---|---|
| 4,880,237 | 11/1989 | Kishishita | 273/138 A |
| 4,882,473 | 11/1989 | Bergeron et al. | 235/380 |
| 5,096,195 | 3/1992 | Gimmon | 273/138 A |
| 5,135,224 | 8/1992 | Yamamoto et al. | 273/143 R |
| 5,179,517 | 1/1993 | Sarbin et al. | 364/410 |
| 5,265,874 | 11/1993 | Dickinson et al. | 273/138 A |
| 5,290,033 | 3/1994 | Bittner et al. | 273/138 A |
| 5,321,241 | 6/1994 | Craine | 235/380 |
| 5,371,345 | 12/1994 | LeStrange et al. | 235/380 |
| 5,397,125 | 3/1995 | Adams | 273/138 A |
| 5,429,361 | 7/1995 | Raven et al. | 273/138 A |
| 5,451,756 | 9/1995 | Holzer et al. | 235/381 |
| 5,457,306 | 10/1995 | Lucero | 235/380 |
| 5,458,333 | 10/1995 | Takemoto et al. | 273/381 A |
| 5,491,326 | 2/1996 | Marceau et al. | 235/381 |
| 5,557,086 | 9/1996 | Schulze et al. | 235/380 |
| 5,577,959 | 11/1996 | Takemoto et al. | 463/25 |
| 5,595,538 | 1/1997 | Haste, III | 463/17 |
| 5,627,356 | 5/1997 | Takemoto et al. | 235/381 |

FOREIGN PATENT DOCUMENTS

| | | |
|---|---|---|
| 513383 | 11/1992 | European Pat. Off. . |
| 4180788 | 6/1992 | Japan . |
| 4180789 | 6/1992 | Japan . |
| 671036 | 3/1994 | Japan . |
| 2271939 | 5/1994 | United Kingdom . |
| 9416781 | 8/1994 | WIPO . |
| 9420179 | 9/1994 | WIPO . |

*Primary Examiner*—Harold I. Pitts

[57] ABSTRACT

A cashless peripheral device connecting to a gaming system. The gaming system issues a “cash-out” signal when a player quits playing and receives a “cash-in” signal when a player desires to play a game in the gaming system. A stack of continuous unprinted tickets is stored in the interior of the device. A ticket printer prints a coded value, such as a bar code, on a ticket in response to a cash-out signal from the gaming system. A ticket reader reads the amount printed on the ticket. If the printed value corresponds to the value which should have been printed, a ticket-out transport delivers the printed ticket to the player cashing out from the gaming system. When a player inserts the printed ticket into the device a ticket-in transport senses the insertion and the ticket reader reads the coded value from the inserted printed ticket. The ticket reader issues a cash-in signal to the gaming system corresponding to the value read from the coded value on the inserted printed ticket. After reading, the ticket is delivered into a ticket bin, which is secured by means of a lock internally in the housing.

20 Claims, 7 Drawing Sheets

CASHLESS PERIPHERAL DEVICE FOR A GAMING SYSTEM

BACKGROUND OF THE INVENTION

1. Field of the Invention

The present invention relates to a cashless peripheral device for enabling a gaming system having, for example, gaming machines to use a cashless means of exchange and, in particular, to use tickets having bar-encoded information printed thereon.

2. Statement of the Problem

A need exists to provide a cashless gaming system wherein a medium of exchange is used among gaming machines other than a credit card or cash.

It is well known to use tokens such as dollar tokens by players of gaming machines. In a typical gaming machine environment, a player sits at a gaming machine and inserts coins or tokens into the gaming machine. When a player decides to leave the machine and has a winning cash amount in the machine, the player presses a cash-out button and receives the appropriate number of coins or tokens in a cash-out bin. Trays are conventionally available for players to stack and hold the money. The player can then go to another gaming machine and insert coins or tokens. The use of coins and tokens is awkward for players especially in carrying them from place to place and often represents a means of transmitting diseases among players. It also represents a cost to the casino in providing the trays, the tokens, and the machines to count the tokens at the various cashier locations.

In another approach, cards such as credit cards are used. In the case of credit cards, there exists a strong public policy not to allow a person gambling to have access to the credit limit of their credit card at the various gaming machines. Hence, credit card ATM terminals are provided at various other locations in a casino to allow a person to access the credit available in their credit card and then to have it provide cash to the player. The player can then take the cash to the gaming machine or to the cashier to receive tokens. This step of forcing the gambler to go to a remote location and receive cash causes the gambler to think before using credit available on a credit card in the emotional heat of a game.

In another approach, a player card is used to encode the magnetic stripe on the card with the amount of the cash-out from one gaming machine so that the player can use the imprinted amount to play at another gaming machine.

In yet another approach, a player card is used and all communications with respect to the gambler's current balance is displayed at a particular machine. For example, upon insertion of a player card at a first machine, if the player has a balance of $500.00, the player can go to a second machine and insert the card and a central computer will display $500.00 available for playing at the second machine.

A need exists to provide a player with a form of money similar to the tokens presently used. This provides the player with a feeling of winning something from a particular machine, which the player can then go to another machine to play another game or to take to a cashier to be redeemed for cash.

3. Solution to the Problem

The present invention provides a solution to the problem by providing the player with a more convenient form of the highly popular tokens so that the player can walk away from a game with a physical item and the satisfaction of winning from a particular game which the player can use to play another game or to "cash-in" at a cashier's location.

SUMMARY OF THE INVENTION

A cashless peripheral device is disclosed which connects to a gaming system. The gaming system, for example, could comprise a number of gaming machines interconnected to a central computer. The central computer could also be interconnected to a number of cashier locations. The gaming system issues a "cash-out" signal when a player quits playing and receives a "cash-in" signal when a player desires to play a game in the gaming system.

The cashless peripheral device of the present invention includes a housing. The housing could be mounted to the side of an individual gaming machine or could be located on the counter at a cashier's location.

A stack of continuous unprinted tickets is stored in the interior of the housing. A ticket-out transport mounted inside the housing behind a first formed slot is used to transport the tickets out of the ticket storage. A ticket printer mounted inside the housing between the ticket storage and the ticket-out transport is used to print a coded value, such as a bar code, on a ticket in response to a cash-out signal from the gaming system. The ticket-out transport moves the printed ticket from the ticket printer and past a ticket reader, which reads the amount, printed on the ticket. If the printed value corresponds to the value which should have been printed, the ticket-out transport delivers the printed ticket to the player cashing out from the gaming system.

Likewise, when a player, having a printed ticket inserts the printed ticket into a second form slot, a ticket-in transport senses the insertion and moves the ticket past the ticket reader which reads the coded value from the inserted printed ticket. The ticket reader issues a cash-in signal to the gaming system corresponding to the value read from the coded value on the inserted printed ticket. After reading, the ticket is delivered into a ticket bin, which is secured by means of a lock internally in the housing.

In the preferred embodiment, the coded value on the printed ticket is in bar code format and the ticket printer is a thermal bar code printer.

In the preferred embodiment, the ticket-in transport and the ticket-out transport uses a roller transport.

In the preferred embodiment, a ticket cutter is located between the ticket printer and the ticket-out transport and cuts the printed ticket from the adjacent unprinted ticket in the continuous stack of unprinted tickets.

In the preferred emodiment, the ticket-in transport delivers the inserted printed ticket back out from the housing through the second formed slot when the read coded value from the inserted ticket is invalid.

BRIEF DESCRIPTION OF THE DRAWINGS

The present invention can be more readily understood in conjunction with the accompanying drawings, in which.

DETAILED SPECIFICATION

1. Overview

Figure 1:
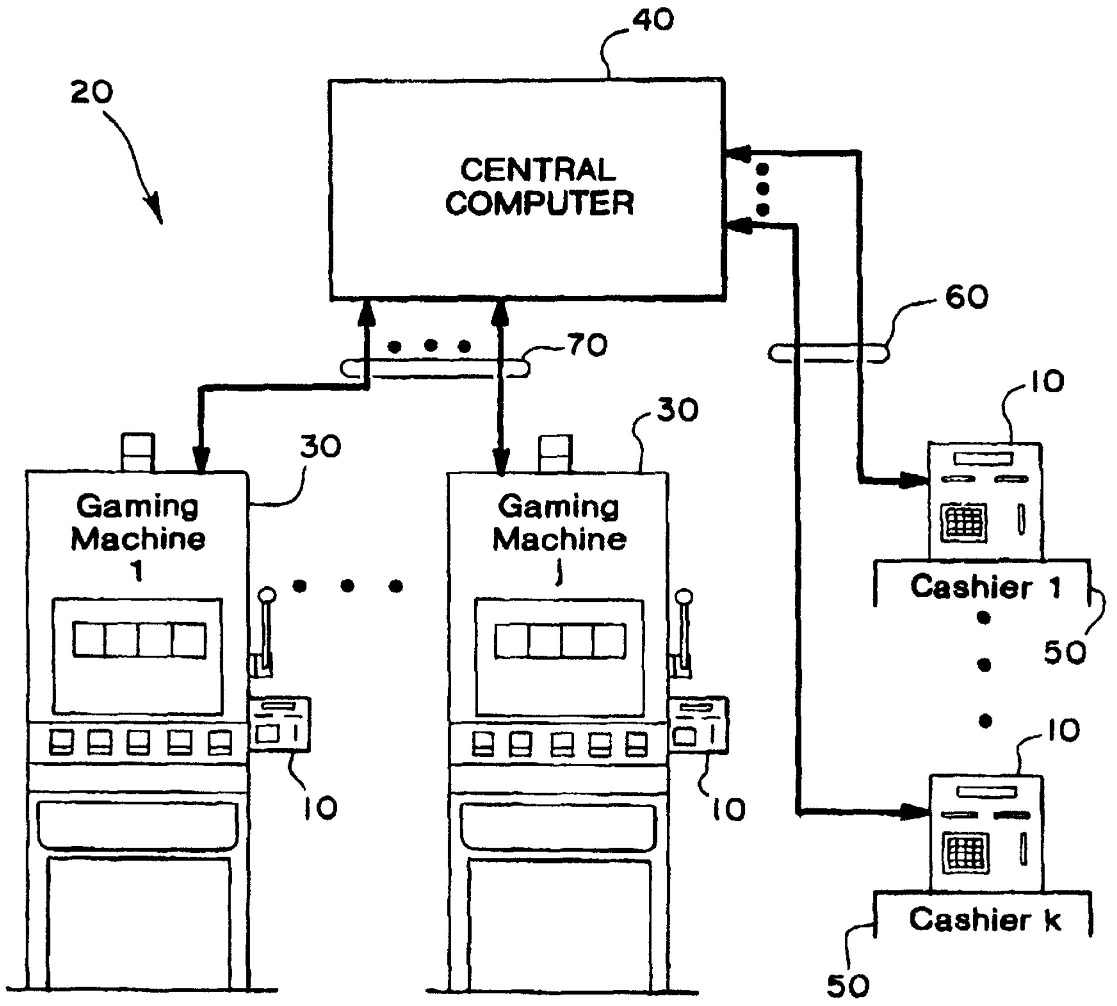
FIG. 1 sets forth the interconnection between various gaming machines, a central computer, and the cashless peripheral devices of the present invention located at the gaming machines or at cashier locations.

In FIG. 1, the cashless peripheral device 10 of the present invention is shown interconnected to a gaming system 20. In this embodiment of the gaming system 20, a number of gaming machines 30 (for example, 1–j) are shown interconnected to a central computer 40. The central computer 40 is also connected to the cashless peripheral devices 10 at cashiers'stations 50 (for example cashiers' stations 1–k).

It is to be understood that, under the teachings of the present invention, the central computer 40 can interconnect directly to the cashless peripheral devices 10 such as shown for cashiers' stations 50, or the central computer 40 can connect indirectly to the cashless peripheral devices 10 by first connecting to a gaming machine 30 which in turn is interconnected with the cashless peripheral device 10. Central computer 40 interconnects with devices 10 over bus 60 and with gaming machines 30 over buses 70.

Under the teachings of the present invention, the gaming machines 30 can be any suitable gaming machines such as slot machines, poker machines, keno machines, etc. and the cashiers' stations 50 can involve any of a number of different embodiments including being located at a live card game table area so that a dealer can interact with a player to receive cash under the teachings of the present invention or at a cashier station.

It is also to be expressly understood that the central computer 40 can be located physically at a different location than either the gaming machines 30 or the cashier stations 50 within or without the same casino. It is also to be expressly understood that the central computer can comprise a number of different computers. For example, a bank or gaming machine could be connected to a computer which, in turn, connects to a remote computer. Or a computer could connect to all cashier stations which in turn connects to a remote computer.

2. Ticket

Figure 2:
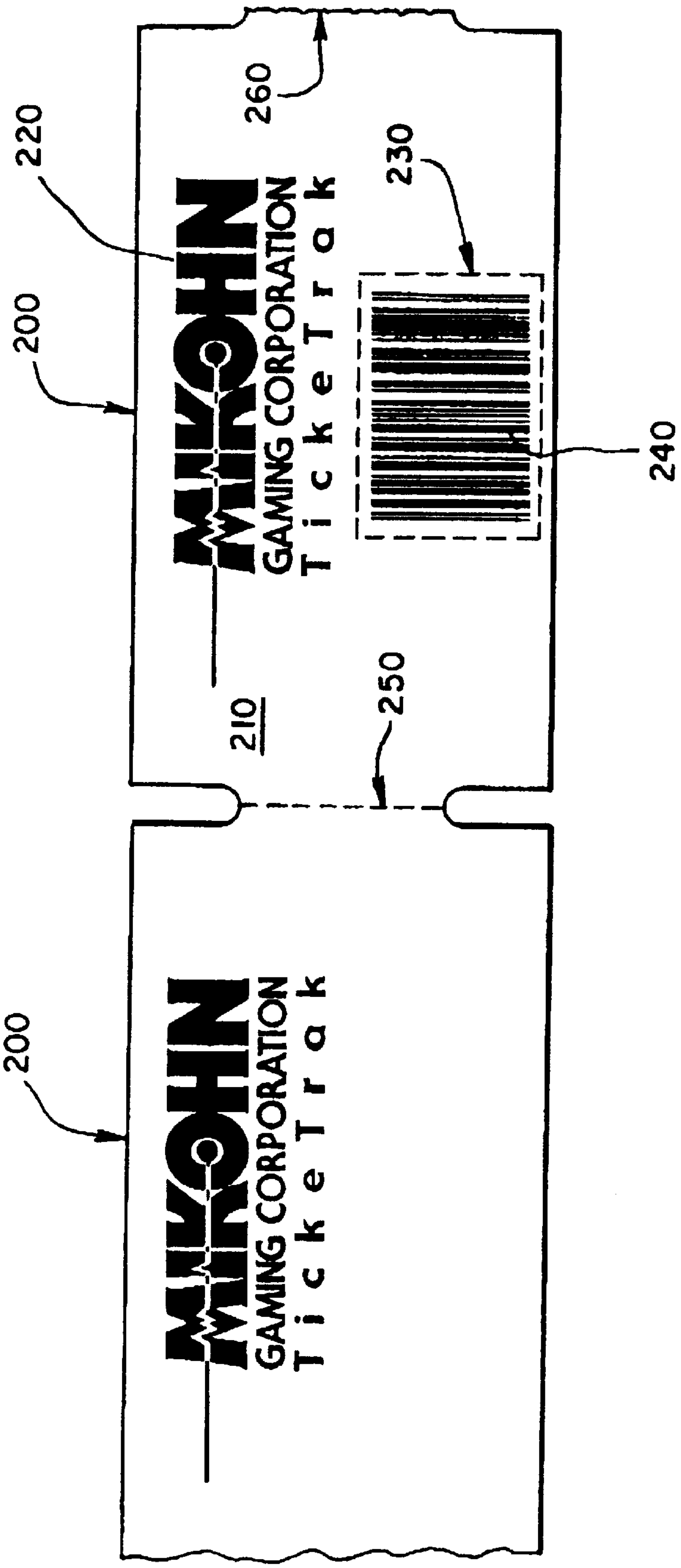
FIG. 2 illustrates the front of the ticket of the present invention.
Figure 3:
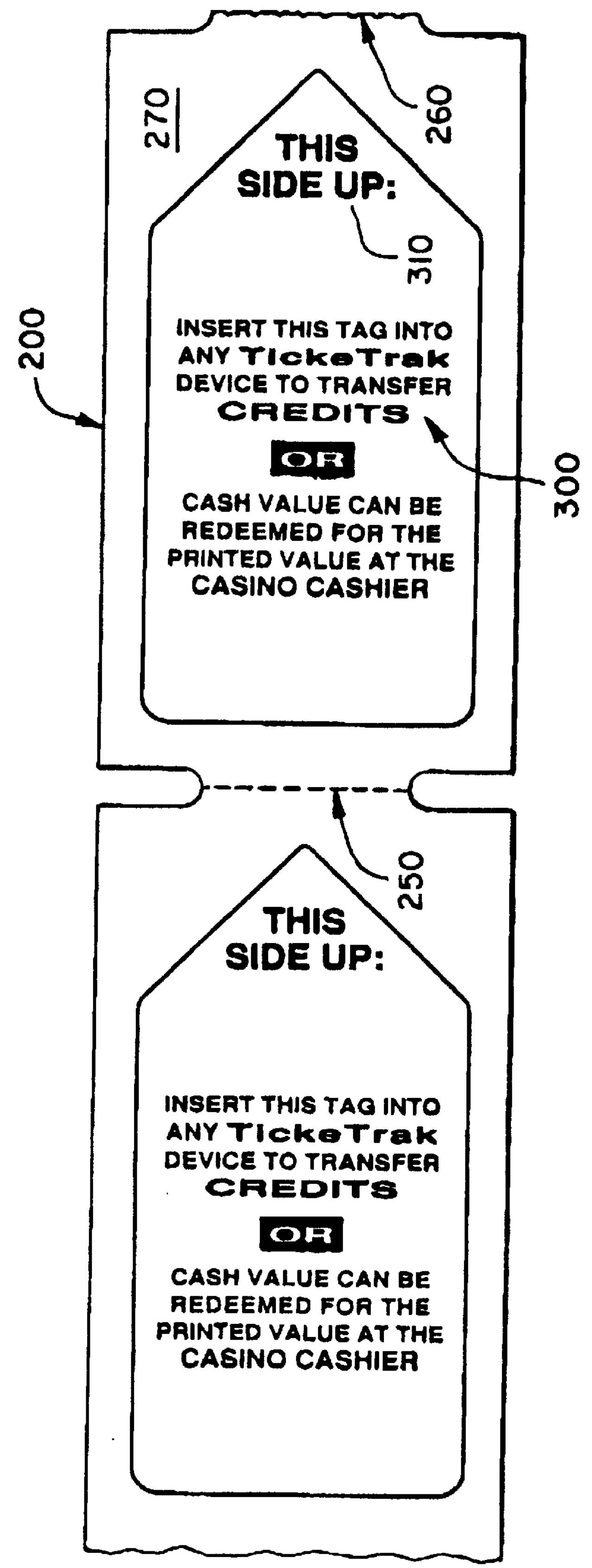
FIG. 3 illustrates the back of the ticket of the present invention.

In FIGS. 2 and 3, a preferred embodiment for the ticket of the present invention is shown. The front side 210 of the ticket 200 contains the name 220 of the casino and a region 230 in which a bar code 240 is printed.

In FIG. 2, tickets 200 are originally in one continuous stack or roll and are joined at region 250. The tickets can be separated from each other by cutting or tearing as shown by edge 260.

In FIG. 3, the reverse side 270 of the ticket 200 is shown which can be used to print instructions 300 and a sense of (1) orientation and (2) direction 310.

It is to be expressly understood that many forms of the ticket 200 may be used under the teachings of the present invention. Each ticket 200 at least carries the coded value information and information pertaining to a sense of direction 310. The instructions 300 and the casino name 220 are optional.

3. Details of Cashless Peripheral Devices

Figure 4:
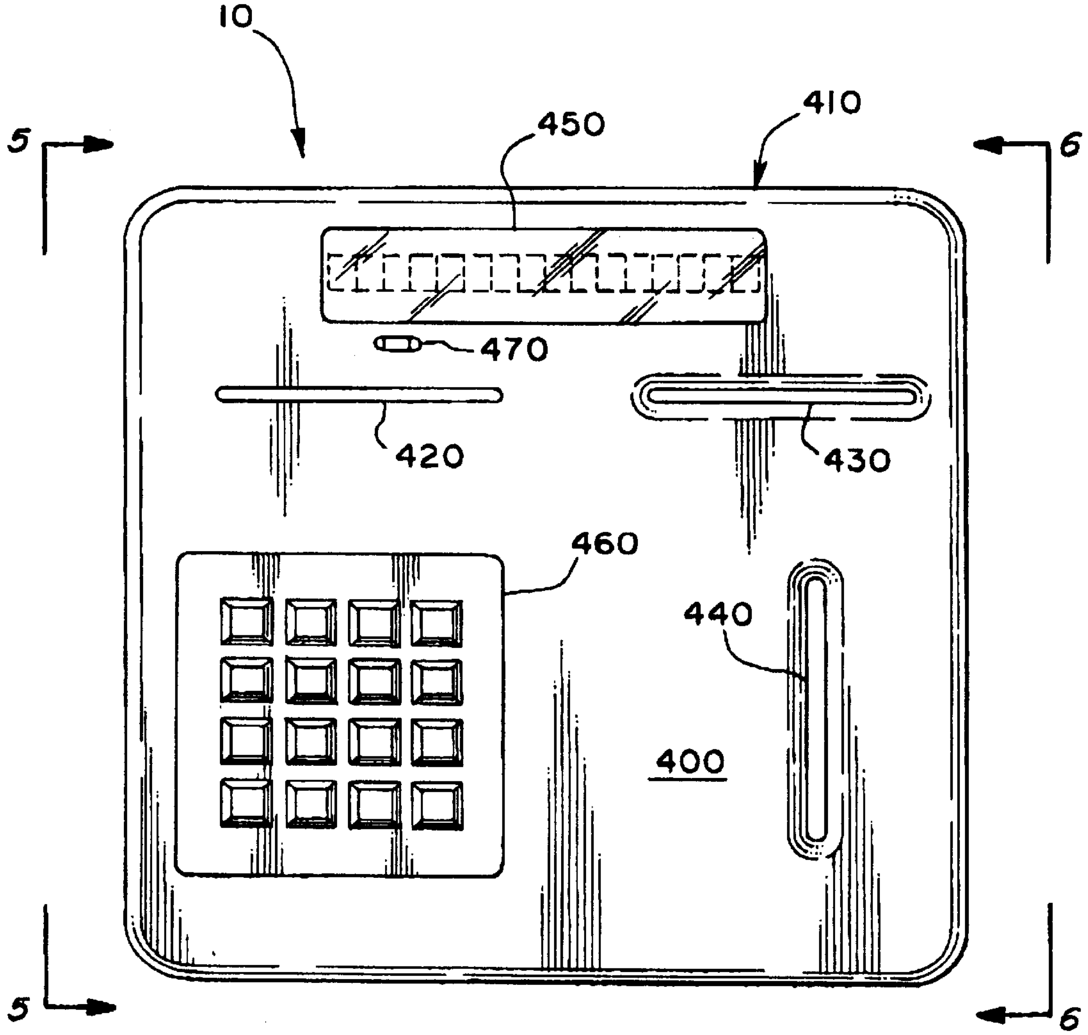
FIG. 4 is a front planar view of the front surface of the cashless peripheral device of the present invention.
Figure 5:
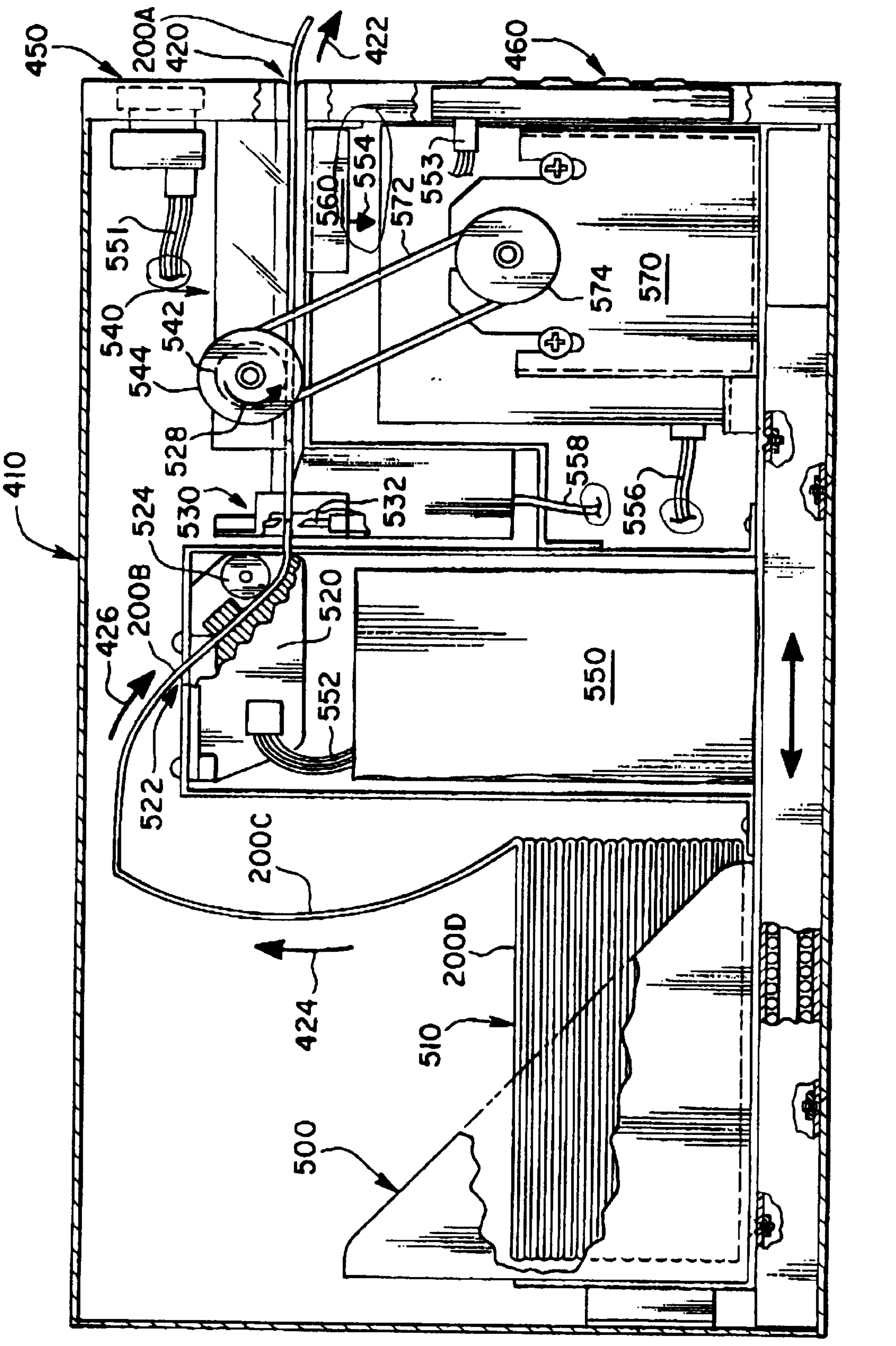
FIG. 5 is a side planar view of the cashless peripheral device of the present invention showing the printing of the ticket of FIG. 3.
Figure 6:
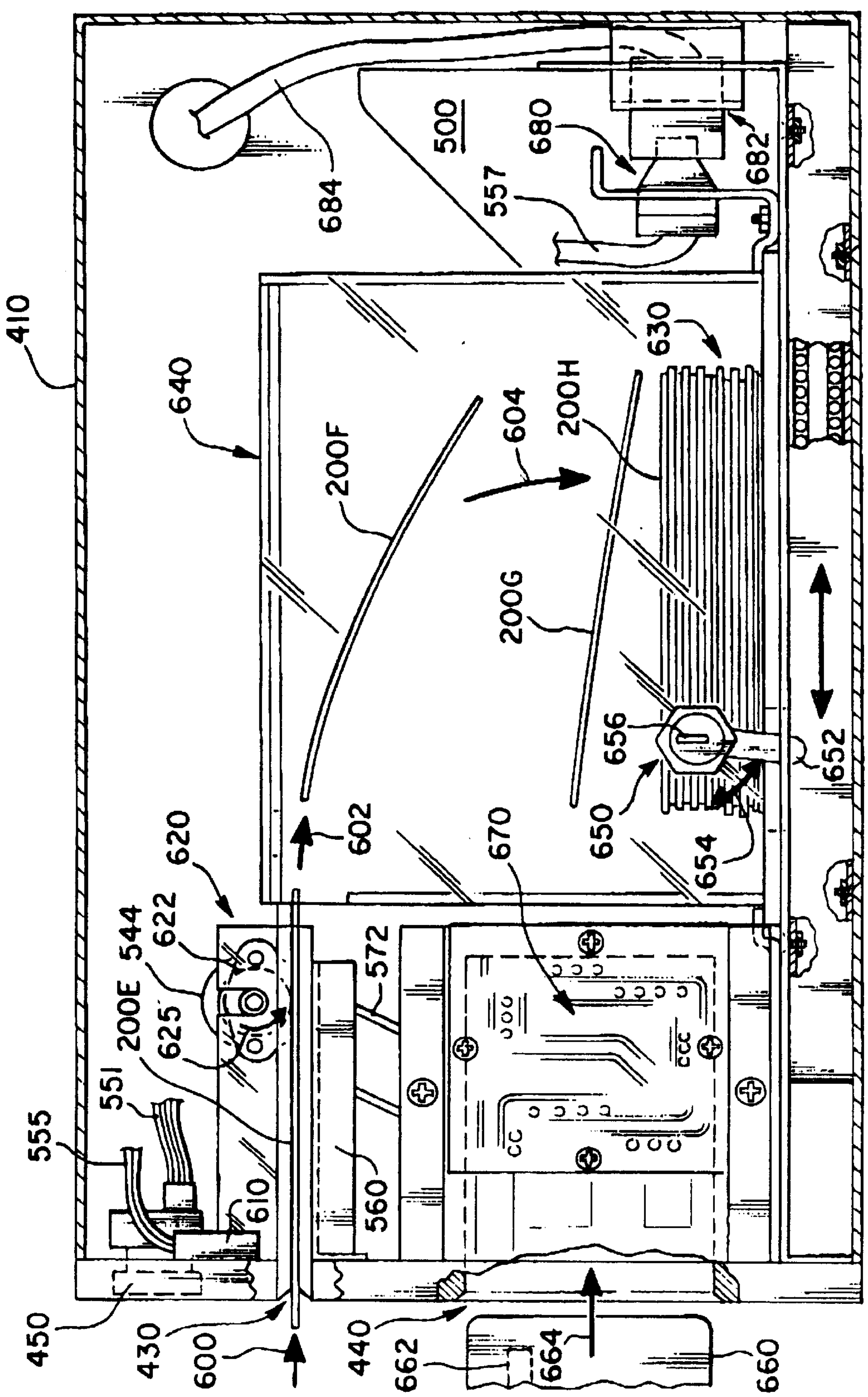
FIG. 6 is a side planar view of the cashless peripheral device of the present invention showing the reading of a printed ticket of FIG. 3.

In FIGS. 4–6, the details of the cashless peripheral device 10 of the present invention is set forth.

In FIG. 4, the front surface 400 of a housing 410 for the cashless peripheral device 10 of the present invention is shown. The front surface has a first formed slot 420; a second formed slot 430, and a third formed slot 440. Formed slots 420 and 430 are oriented horizontally on the surface 400 near the top of the housing 410. Formed slot 440 is oriented vertically on surface 400 and is located in the lower portion of the surface 400 under formed slot 430.

A display 450 is, in the preferred embodiment, oriented in the center top of surface 400 above formed slots 420 and 430.

A keypad 460 is placed under formed slot 420 in the bottom region of the surface 400 to one side of formed slot 440.

It is to be understood that this a preferred orientation for the slots 420, 430 and 440 as well as for the display 450 and keypad 460. It is to be expressly understood that other orientations and physical locations for these components could also be used under the teachings of the present invention.

It is through formed slot 420 that a ticket, printed inside the housing 410, is delivered out from the housing 410 to a player. It is through formed slot 430 that a player inserts a printed ticket. In reference to FIG. 3, the player would insert ticket 200 with the "THIS SIDE UP" message 310 into slot 430. Message 310 positively instructs the player to properly insert the ticket 200 with the proper side up (i.e., orientation) and with the proper end in first (i.e., direction).

The player can insert a player card into slot 440.

The display 450 is a conventional digital display used to convey messages to the player. Keyboard 460 is a conventional keypad which enables the player to input messages to the gaming system 20 of the present invention. In the preferred embodiment, the keypad 460 is a 16-key keypad.

Finally, an indicator light 470 is provided to inform the player that the cashless peripheral device 10 is operational.

A. Printing of Ticket

In FIG. 5, the arrangement of components to print a ticket 200 with the coded value 240 in region 230 of the ticket is shown.

In FIG. 5, a ticket storage 500 which in the preferred embodiment is a plastic ticket supply holder of triangular shape (as illustrated), holds a continuous supply of unprinted tickets 510. The tickets 200 are delivered through a thermal ticket printer 520 which prints the bar code 240 in region 230 of the ticket 200. The printed ticket is delivered through a ticket cutter 530 by a ticket transport 540.

In FIG. 5, ticket 200D is on the top of the continuous stack 510. The ticket transport 540 is moving a printed and cut ticket 200A out from slot 420 in the direction of arrow 422. Ticket 200B is in position for printing by printer 520 and ticket 200C is unprinted and has been lifted upwardly in the direction of arrow 424. Ticket 200B moves in the direction of arrow 426 through printer 520.

In operation, the end of a ticket 200 is inserted into the printer 520 at opening 522. The end engages a roller 524 which grasps the ticket and pulls it forward (i.e., arrow 426). The ticket printer 520 is interconnected with control electronics 550 over cables 552. When it is desired to print a bar code 240 in region 230, the electronics 550 receives the cash-out signal from the gaming system 20 and activates the ticket printer 520 to print the corresponding bar coded value 240. The bar code printer 520 advances the printed ticket through the cutter 530 and into the transport 540. The transport 540 holds the ticket while the cutter 530 cuts the ticket along line 250 (as shown in FIGS. 2 and 3). The cut ticket is held in place by the transport 540 until the ticket is read by a bar code scanner 560. The bar code scanner 560 delivers the read bar code information over cable 554 to electronics 550. If the information scanned corresponds to the information printed on the ticket, the transport 540 is activated and causes the ticket to exit 422 from slot 420. If the information is not correct, the transport 540 holds the ticket and the electronics 550 delivers an error message to the central computer 40 and displays a message in display 450 to the player.

In FIG. 5, ticket 200A has been printed and cut from the adjacent nonprinted ticket 200B. The transport 540 has a pulley wheel 544 which is mechanically coupled to roller 542. A stepper motor 570 under control of cable 556, which is connected to electronics 550, controls the operation of the roller 542 by means of a belt 572 engaging a corresponding pulley 574. After ticket 200A has been fully ejected 422 from slot 420, the device 10 of the present invention is ready to print ticket 200B. Hence, when a new player sits at the gaming machine, and pushes a cash-out command, the gaming system 20 calculates the amount of money due to the player and prints it on ticket 200B. The roller 524 then advances ticket 200B as shown by arrow 426 into the transport module 540 until edge 250 between tickets 200B and 200C align with the cutters 532 in the cutter 530. At this point, the cutters 532 are activated by commands sent through cable 558 from the electronics 550. After cutting, the ticket is held in place so that the bar code scanner 560 can read the printed code and verify that it is correct. Then the stepper motor 570 causes the roller 542 to eject ticket 200B. The process is repeated for each additional cash-out value printed on each upcoming ticket 200 from stock 510.

In FIG. 5, the display 450 also has a cable 551 which connects to the electronics 550. Likewise, the keypad 460 has a cable 553 which connects to electronics 550.

The packaging of the various components into the housing 410 as shown in FIG. 5 is one preferred embodiment. In this embodiment, the stack 510 of tickets 200 is located in the rear of the housing 410. The bar code printer 520 is elevated and positioned in the center of the housing 410 above the electronics 550. This design enables the tickets 200 to be elevated upwardly 424 and into the printer 520. The elevation of the tickets 200 is maintained during the printing, cutting, and transporting processes described above. Hence, the cutter 530 and the ticket transport 540 are also located in the upper regions of the housing 410. This permits the stepper motor 530 to be located underneath the transport module 540 and it also permits the bar code scanner 560 to be located underneath the transport 540. This provides for an efficient and compact arrangement for the components. However, it is to be expressly understood that other packaging arrangements could be utilized for the printing of the ticket under the teachings of the present invention.

B. Reading Ticket

In FIG. 6, the other side of the housing 410 opposite that of FIG. 5 is shown. Here, a ticket 200E is inserted in the direction of arrow 600 into slot 430. As soon as the ticket 200E is inserted, an optical sensor 610 detects it. The sensor 610 is connected by means of a cable 555 to the electronics 550. This causes the stepper motor 570 (FIG. 5) to activate in the ticket-in transport 620 to engage the ticket 200E. The roller 622 is then stopped so that the scanner 560 can read the bar code 240 imprinted in area 230 of the ticket 200E. The scanner 560 delivers the read information over cable 554 (FIG. 5) to the electronics 550. After a determination that inserted ticket 200E is valid, the stepper motor 570 is again activated to cause the roller 622 to rotate in the direction 625 causing the ticket to be quickly ejected in the directions 602 and 604. Tickets 200F, 200G, and 200H are used to illustrate the path the ticket takes as it falls into a secured storage bin 640. The secured storage bin 640 has a keyed lock 650 which has a outwardly extending member 652 to secure the read (spent) tickets 630 in the storage bin 640. The locks 652 moves in the direction of 654 when a key is inserted in slot 656.

Also shown in FIG. 6 is a player card 660 which may include a magnetic stripe 662 carrying identification information for the player. Player card 660 is inserted in the direction of arrow 664 into slot 440 and is read by conventional card reading circuitry 670. The card reading circuitry 670 is in communication over a cable, not shown, with electronics 550. Under the teachings of the present invention, the card 660 can be inserted and removed or simply inserted and kept in place until the player leaves.

Also shown in FIG. 6 is a cable connection 557 which connects with electronics 550. Cable 557 interfaces with a connector 680 which in turn engages connector 682 and cable 684 which interconnects to standard interface connections in the gaming machine 30 or directly with a central computer 40 in the case of the cashier station 50.

Again, the arrangement of components is the preferred embodiment as shown in FIG. 6. The tickets 200 are inserted into slot 430 which is located in the upper region of the housing 410 so as to provide sufficient elevation for delivery into storage bin 640 so that a large number of tickets can be stored in the secured storage bin 640. This design permits the card reader 670 to be placed beneath the transport 620. In addition, the connector 680 and 682 are located behind the storage bin 640. It is to be expressly understood that other suitable arrangements of components shown in FIG. 6 could be utilized under the teachings of the present invention.

C. Control Electronics

Figure 7:
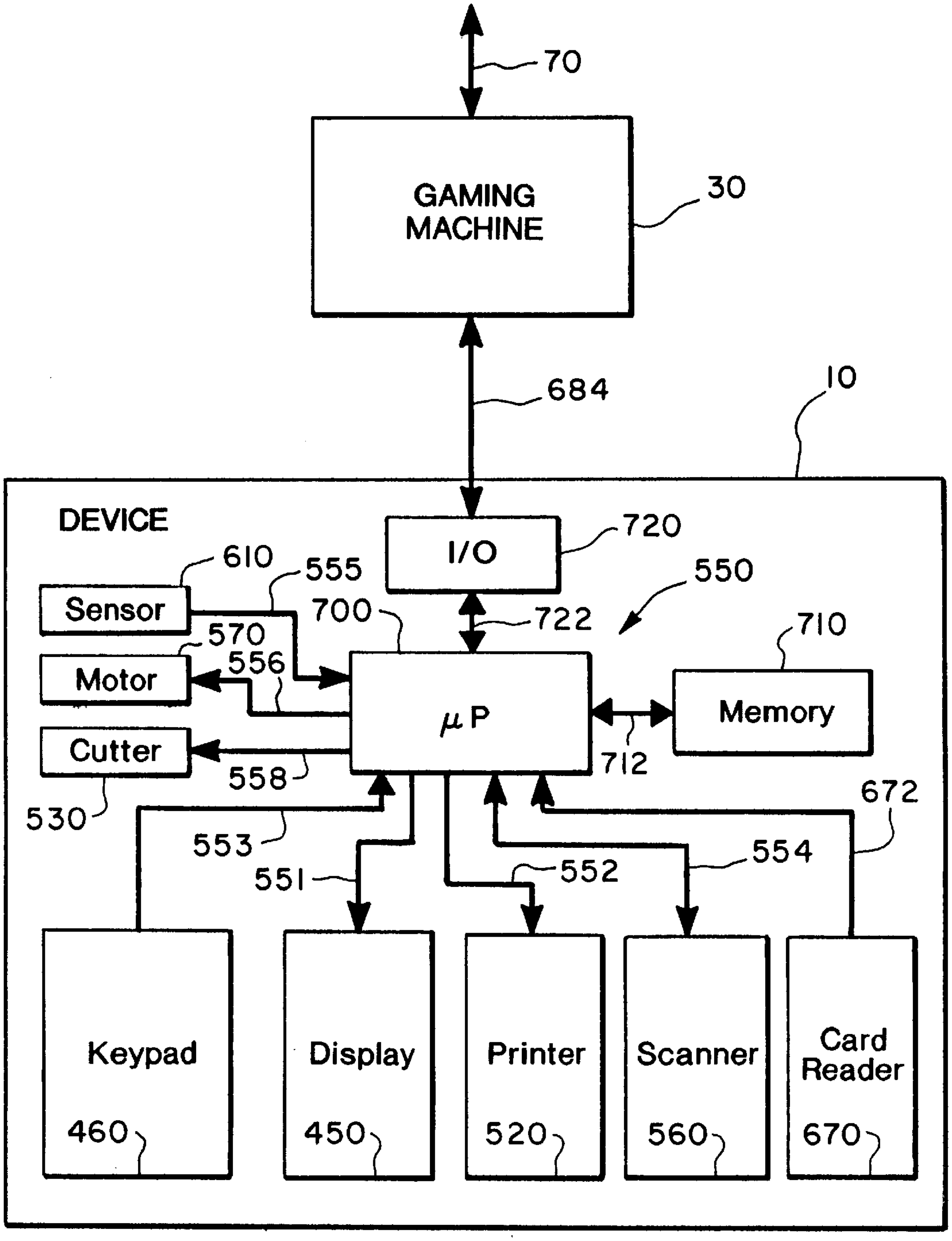
FIG. 7 is a system block diagram showing the interconnection of the cashless peripheral device to a gaming machine.

The control electronics 550 for device 10 of the present invention is shown in FIG. 7. In the preferred embodiment, the control electronics 550 includes a microprocessor 700, a memory 710, and an I/O circuit 720.

It is to be understood that the block diagram configuration shown in FIG. 7 is general in nature and that the actual circuit details need not be disclosed to implement the teachings of the present invention. Furthermore, this shows interconnection with gaming machine 30 and it is to be expressly understood that a similar interconnection with the central computer 40 would occur when the device 10 is located at a cashier station 50 (FIG. 1).

The microprocessor 700 can be any suitable microprocessor interfacing over lines 712 with conventional read/write memory 710. Likewise the I/O 720 can be a number of I/O devices such as a modem which interfaces with the microprocessor over lines 722. Indeed, the combination of the microprocessor 700, the memory 710, and the I/O 720 could be any suitable personal computer design.

Under the teachings of the present invention, when a player sits down at a gaming machine 30 and inserts ticket 200E having a bar code 240 (as shown in FIG. 6), the sensor 610 senses the entry of the ticket and delivers a signal over lines 555 to the control electronics 550 so that the microprocessor 700 is notified that a ticket 200E has been inserted into slot 430. The microprocessor 700 then activates the stepper motor 570 over lines 556 to cause the roller 622 of the ticket-in transport 620 to grasp the inserted ticket 200 and to hold it in place. The microprocessor 700 then activates the scanner 560 over lines 554 to read the value in the bar code 240. This information is stored in memory 710 and is delivered through the I/O 720 over lines 684 to the gaming machine 30 (or to the central computer 40) as the cash-in signal.

Under one option, the microprocessor 700 then activates the motor 570 over lines 556 to deliver the ticket 200 into the storage bin 640. Under another option, the microprocessor 700 waits for authorization from the gaming machine 30 or from the central computer 40 that the ticket is a correct ticket and, if correct, then delivers the cash-in value over lines 684 to the gaming machine 30 so that the player can start the game. Under this option, if the amount is incorrect, then the microprocessor 700 reactivates the stepper motor 570 over lines 556 to cause it to move in the reverse direction to back the ticket out of slot 430 and then to issue a message in display 450 over lines 551 that the ticket is invalid. In addition, the microprocessor 700, the gaming machine 30, or the central computer 40 may issue an alarm for an attendant to visit the player at the gaming machine.

When the player is finished at the gaming machine 30, the player presses a conventional cash-out button which causes the gaming machine 30 to deliver over lines 684 through 1/O 720 to the microprocessor 700 a cash-out signal. When this occurs, the microprocessor 700 activates the printer 520 over lines 552 to print the bar code 240 in region 230 of ticket 200. After printing, the printer 520 activates roller 524 to move the ticket into the ticket-out transport 540. The microprocessor 700 causes the cutter 530 over lines 558 to cut the ticket at region 250. The microprocessor 700 then activates the stepper motor 570 over lines 556 to further advance the cut ticket into the ticket-out transport 540. The microprocessor 700 then stops the motor 570 and activates the scanner 560 over lines 554 to read the imprinted bar code 240. The microprocessor 700 compares the read value over lines 554 with the cash-in value over lines 684 to determine if a match occurs. If match does not occur, the ticket is held in place by the ticket-out transport 540, a message is displayed in the display 450 that a malfunction has occurred and the microprocessor 700 delivers an alarm message through I/O 720 over lines 684 to the gaming machine 30 or to the central computer 40 that an attendant should immediately visit the machine as a malfunction has occurred. The invalid ticket is firmly held in the ticket-out transport 540 by the roller 542 to prevent the player from receiving the ticket. If a match occurs, the microprocessor 700 then activates the stepper motor 570 over lines 556 to deliver the ticket out to the player.

When a player sits at the machine 30, and inserts a player card 660, the card reader 670 reads the information on the magnetic strip 662 and delivers that information over lines 672 to the microprocessor 700 which stores it in memory 710 and which then delivers the information to the gaming machine 30 and/or to the central computer 40. It is to be understood that the central computer 40 can deliver a message back to the device 10 for display in display 450 such as a welcome message to the player.

Under one embodiment of the present invention, the information which is contained in the bar code may also contain other information such as the identity of the player, a PIN number, and a unique ticket number. For example, the following information could be encoded into bar code 240:

1. Cash-in value.
2. Player name and/or player ID number.
3. PIN number.
4. Ticket number.

Hence, when a ticket is printed by printer 520, the microprocessor 700 based upon the information from the player card 660 will also print (in addition to the cash-in value) the player name and/or player ID number and the player PIN. The microprocessor 700 assigns a ticket number to the ticket. All of this information is stored in memory 710 and is delivered back through the gaming machine 30 to the central computer (or directly to the central computer 40) for permanent storage. The printed ticket now contains a substantial amount of information. Hence, when the printed ticket is reinserted into another gaming machine 30 (or in some cases the same gaming machine), the microprocessor 700 verifies that the information from the inserted player card 660 corresponds to the information printed in the bar code. If the information does not correspond, an alarm signal, as discussed above, is raised. Before accepting the cash-in ticket, the microprocessor 700 may send a message over lines 551 to display 450 requesting the player to enter a PIN number. The player would enter the PIN number in key pad 460 which delivers the signals over lines 553 to the microprocessor 700. If an incorrect PIN number is entered, again, the ticket may be ejected out from the machine through slot 430 or, in some embodiments, the tickets can be seized and held by the rollers until an attendant and/or security guard is called to visit the machine. In either event, an alarm is raised back to the central computer 40 that an invalid PIN number has been entered. Hence, under the teachings of the present invention, the printed ticket 200 contains a substantial amount of security information to prevent the counterfeiting of such tickets and the illegal use of such tickets if, for example, found on a floor.

It should be appreciated that a method and apparatus for cashless gaming peripheral device has been disclosed. It is to be expressly understood that the claimed invention is not to be limited to the description of the preferred embodiment or specific examples but encompasses all modifications and alterations within the scope and spirit of the inventive concept.

We claim:

1. A cashless peripheral device for connecting to a gaming system, said gaming system issuing a cash-out signal when a player quits playing said gaming system and said gaming system receiving a cash-in signal when said player starts playing said gaming system, said cashless peripheral device comprising:

a plurality of continuous unprinted tickets, means for storing said plurality of continuous unprinted tickets, means for printing a coded value based on said cash-out signal from said gaming system on one of said unprinted tickets, means receiving said printed ticket from said printing means for transporting said printed ticket, means for reading said coded value on said printed ticket, said ticket transport advancing said printed ticket out of said transporting means when said coded value read matches said coded value printed, means for receiving a printed ticket inserted by said player, said ticket reader means reading the coded value from said inserted printed ticket in said receiving means, said ticket reader means issuing said cash-in signal corresponding to said read coded value to said gaming system, means receiving the read ticket from the receiving means for securely storing the read ticket.

2. A cashless peripheral device for connecting to a gaming system, said gaming system issuing a cash-out signal when said player quits playing said gaming system and said gaming system receiving a cash-in signal when said player starts playing said gaming system, said cashless peripheral device comprising:

a housing, a front surface to said housing, said front surface having first and second formed slots, a plurality of continuous unprinted tickets, a ticket storage mounted inside said housing for storing said plurality of continuous unprinted tickets, a ticket-out transport mounted inside said housing behind said first formed slot, a ticket printer mounted inside said housing between said ticket storage and said ticket-out transport, a ticket reader mounted inside said housing in a region behind said first and second formed slots, said ticket printer responsive to said cash-out signal from said gaming system for printing a coded value based on said cash-out signal on one of said unprinted tickets, said ticket reader reading said coded value on said printed ticket, said ticket transport advancing said printed ticket out of said first formed slot when said coded value read matches said coded value printed, a ticket-in transport mounted in said housing behind said second formed slot for receiving a printed ticket inserted by said player, said ticket reader reading the coded value from said inserted printed ticket, said ticket reader issuing said cash-in signal corresponding to said read coded value to said gaming system, a ticket bin receiving the read ticket from the ticket-in transport for securely storing the read ticket.

3. The cashless peripheral device of claim 2 wherein said coded value is in bar code format.

4. The cashless peripheral device of claim 2 wherein the ticket printer is a thermal bar code printer.

5. The cashless peripheral device of claim 2 wherein the ticket-in and ticket-out transports roller fed.

6. The cashless peripheral device of claim 2 further comprising a ticket cutter mounted inside said housing between said ticket printer and said ticket-out transport, said ticket cutter cutting said printed ticket from the adjacent unprinted ticket.

7. The cashless peripheral device of claim 2 wherein said ticket-in transport delivers said inserted printed ticket out of said second formed slot when said read coded value from said inserted ticket is invalid.

8. The cashless gaming system of claim 2 further comprising a display on said front surface.

9. The cashless gaming system of claim 2 further comprising a keypad on said front surface.

10. The cashless gaming system of claim 2 further comprising:

a player card carrying identification information, a formed third slot on the front surface of said housing, a card reader in said housing behind said third formed slot for reading said identification information on said player card.

11. The cashless gaming system of claim 2 wherein said ticket bin is locked into said housing.

12. The cashless gaming system of claim 2 wherein said ticket-out transport holds said printed ticket when said coded value read is different from said coded value printed.

13. The cashless gaming system of claim 2 further comprising a sensor hear said second formed slot for sensing when a ticket is inserted into said second formed slot.

14. A cashless peripheral device for connecting to a gaming system and reading a player card of a player containing identification information, said gaming system issuing a "cash-out" signal when said player quits playing said gaming system and said gaming system receiving a "cash-in" signal when said player starts playing said gaming system, said cashless peripheral device comprising:

a housing, a front surface to said housing, said front surface having first, second, and third formed slots, a display mounted in the center near the top of said front surface for displaying messages to said player, a keypad mounted near the bottom and one side of said front surface for receiving information from said player, said first formed slot disposed above said keypad on said front surface, said second formed slot disposed above said second formed slot on said front surface, said third formed slot disposed near the bottom of said front surface on a side of said front surface opposite said keypad, a card reader mounted inside said housing behind said third formed slot for reading said identification information from said player card when said player card is inserted into said second formed slot, a plurality of continuous unprinted tickets, a ticket storage mounted inside said housing behind said keypad for storing said plurality of continuous unprinted tickets, a ticket-out transport mounted inside said housing behind said first formed slot, a ticket cutter mounted inside said housing behind said ticket-out transport, a ticket printer mounted inside said housing between said ticket storage and said ticket cutter, a ticket scanner mounted inside said housing in a region behind said first and second formed slots, said ticket printer responsive to said cashout signal for printing a coded value based on said "cash-out" signal and the identity of said player based on said identification information from said player card on one of said unprinted tickets, said ticket transport advancing said printed ticket until the end of said printed ticket extends from said first formed slot, said ticket cutter cutting said extended printed ticket from the adjacent unprinted ticket, said ticket reader reading said coded value on said cut ticket, said ticket transport advancing said cut ticket out of said first formed slot when said coded value read matches said coded value printed, a ticket-in transport mounted in said housing behind said second formed slot for receiving a printed ticket inserted by said player, said ticket reader reading the coded value and the identity of said player from said inserted printed ticket, said ticket reader issuing a signal corresponding to the read value to when said read identity matches the identification information from said player card, a ticket bin receiving the read ticket from the ticket-in transport for securely storing the read ticket.

15. The cashless peripheral device of claim 14 wherein said coded value is in bar code format.

16. The cashless peripheral device of claim 14 wherein the ticket printer is a thermal bar code printer.

17. The cashless peripheral device of claim 14 wherein the ticket transport is a roller fed transport.

18. The cashless peripheral device of claim 14 comprising a display on said front surface.

19. The cashless peripheral device of claim 14 comprising a keypad on said front surface.

20. The cashless peripheral device of claim 14 wherein said ticket bin is locked into said housing.

* * * * *